Aug. 3, 1943.　　　　J. C. MEIER　　　　2,325,696
GEAR CUTTING MACHINE
Filed Aug. 20, 1940　　　2 Sheets-Sheet 2
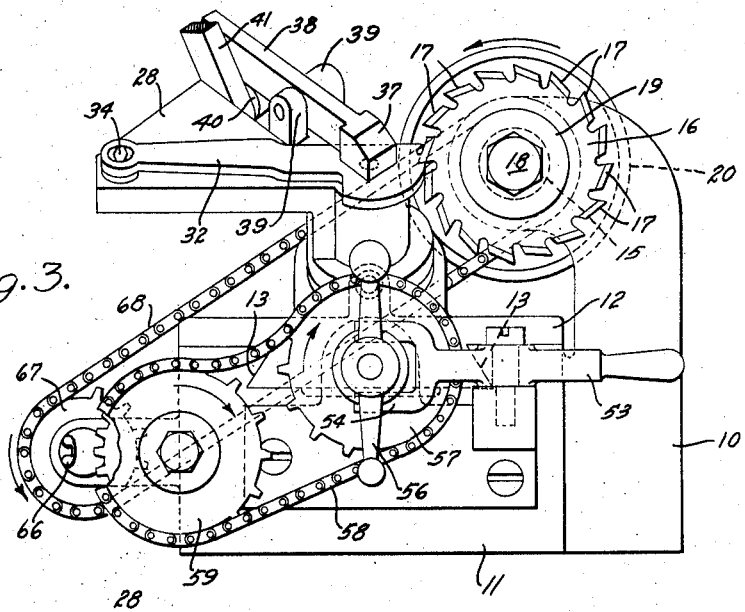
Fig. 3.
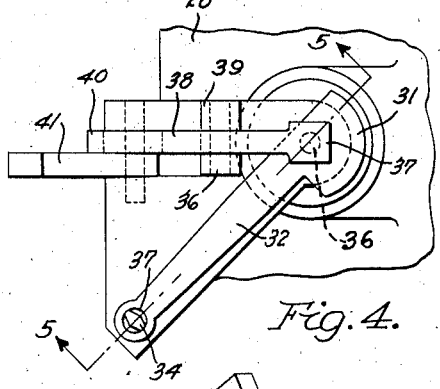
Fig. 4.
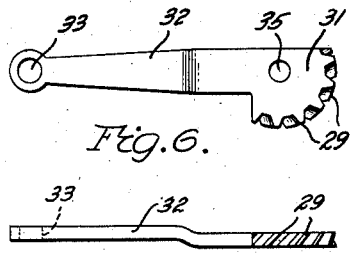
Fig. 6.
Fig. 7.
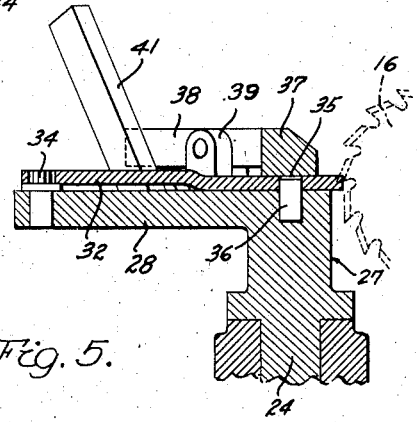
Fig. 5.
Inventor
JULIAN C. MEIER.
By 
Attorney Patented Aug. 3, 1943

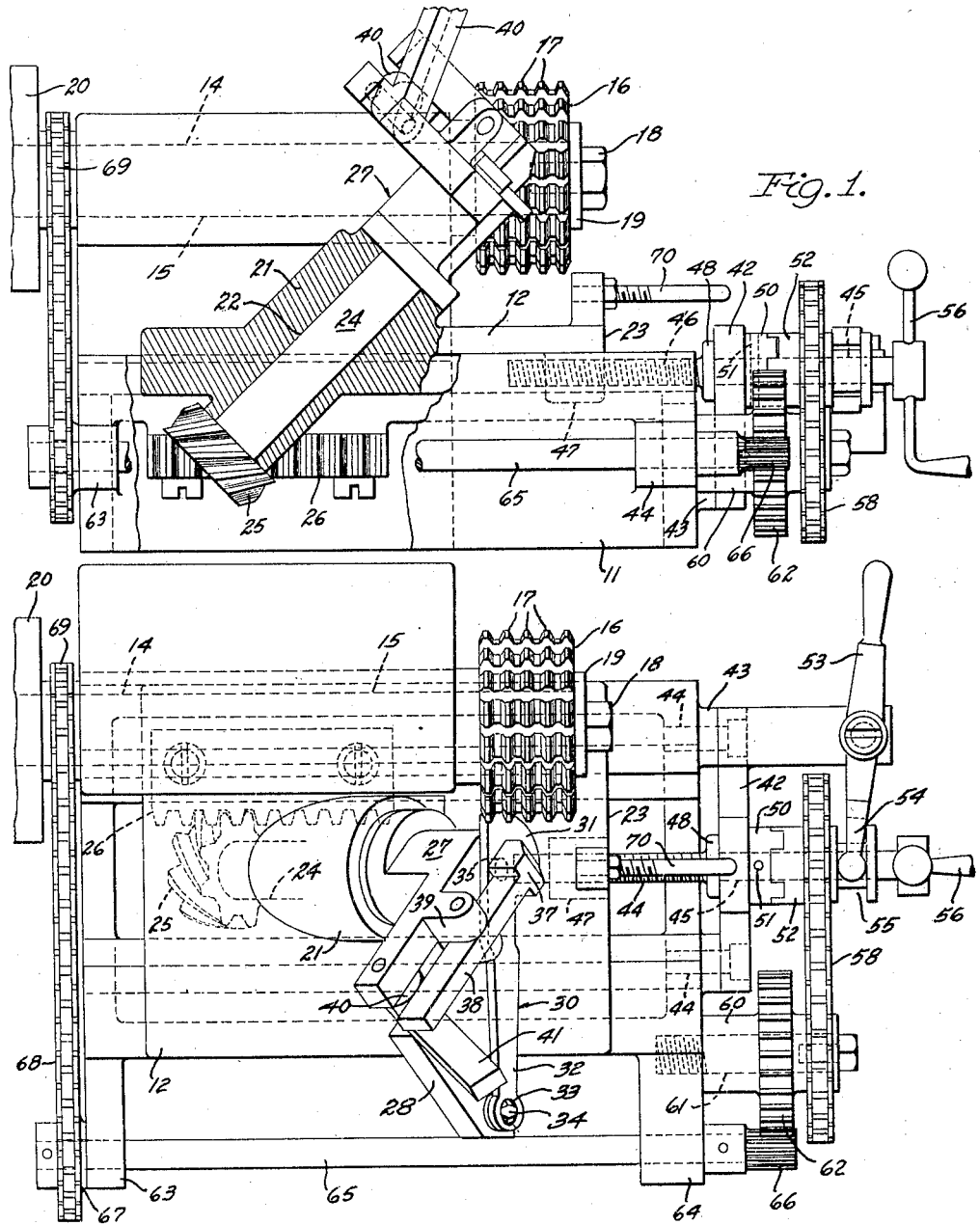

2,325,696

UNITED STATES PATENT OFFICE 2,325,696

GEAR CUTTING MACHINE

Julian C. Meier, Detroit, Mich.

Application August 20, 1940, Serial No. 353,404

7 Claims. (Cl. 90—9)

This invention relates generally to cutting machines and more particularly to gear cutting machines.

One of the objects of the present invention is to provide a new and improved machine for cutting helical gears.

Another object of the invention is to provide a machine which will rapidly and accurately cut a segmental helical gear.

Another object of the invention is to provide a simple, easily operated machine for cutting helical gears with a plain milling cutter.

Other objects of the invention will become apparent from the following detail description taken with the accompanying drawings in which—

Figure 1 is a side view partly broken away and partly in section of the gear cutting machine;

Fig. 2 is a top plan view of the machine;

Fig. 3 is an end view of the machine;

Fig. 4 is a detail view in elevation of a holder for holding a gear blank during the cutting operation;

Fig. 5 is a sectional view taken along the line 5—5 of Fig. 4;

Figs. 6 and 7 are views of a finished segmental gear cut by the present machine.

Referring to the drawings by characters of reference, the gear cutting machine includes a frame 10 having a base 11 on which a carrier or work supporting table 12 is slidably mounted for movement longitudinally of the machine, the table 12 having dovetail slide or guideways 13 with the base 11. The frame 10 extends upwardly above and overhangs the base 11 and is provided adjacent its upper end with a bore or bearing 14 having its longitudinal axis substantially parallel with the table slideways 13 or parallel with the direction of movement of the table 12. Rotatably mounted in the bore 14 is a shaft 15 on one end of which is secured for rotation therewith, a milling cutter 16 having a plurality of rows of radially spaced cutting teeth 17 which rows of teeth are parallel and are transverse or at right angles to the axis of rotation of the shaft 15. A nut 18 screwthreaded onto a reduced end portion of the shaft 15 against a washer 19 holds the milling cutter 16 against end thrust movement. On the other end of the shaft 15 is a pulley 20 for a belt drive but it is to be understood that the cutter 16 may be driven from a source of power in any suitable manner.

Referring again to the table 12, a boss 21 formed integral with the table 12 extends upwardly from the top surface thereof and is provided with a bore 22 therethrough having its longitudinal axis at an angle to the horizontal, as shown in Fig. 1, but in a vertical plane, as shown in Fig. 2. The bore 22 extends upwardly and toward what may be termed the front end 23 of the slide table 12 and rotatably mounted in the bore 22, a shaft 24 is provided with a helical gear 25 which is secured to the lower end of the shaft, below the table 12, and meshes with a fixed gear rack 26 for rotating the shaft upon sliding movement of the table 12.

Integral with the shaft 24 and seating on the upper end of the boss 21, a work support, designated in general by the numeral 27, is provided with an integral plate portion 28, Fig. 3, the upper surface of which is transverse or at right angles to the axis of the shaft 24. On the upper surface of the plate 28 is supported and rigidly secured thereto a gear blank 30 having a segmental portion 31 in the circular edge of which helical teeth 29 are cut by the cutter 16, as the table 12 moves to the right, Fig. 1. This particular type of gear is adapted for opening and closing windows or windshields of motor vehicles and includes an integral arm 32 having an aperture 33 adjacent the outer end thereof. This apertured end of the arm 32 fits over and is retained against movement by a pin 34 projecting up from the top surface of the plate 28. A centrally located aperture 35 is provided in the segmental gear portion 31 to receive a pin 36 which fits into a bored recess opening upwardly through the top surface of the plate 28, see Fig. 5. Adapted to overlie the aperture 35 is the free end 37 of a holddown lever 38 pivoted intermediate its ends to and between a pair of upstanding lugs 39 which are integral with the plate 28. The lever is pivoted in a direction to force the free end 37 thereof downwardly and to hold it down by a cam 40 operable by a handle 41 to hold the segmental gear tightly to the plate 28 for the gear cutting operation.

A bearing plate 42 is provided and is spaced from the right hand end of the base 11 by bosses 43, the plate 42 being rigidly secured to the base by bolts 44 or by other suitable means. A rod 45 is rotatably supported in a bore in the plate 42, the shaft extending longitudinally of the table slideways 13 and having a threaded portion 46 which screwthreads into a lug 47, integral with and depending from the table 12. An external flange 48 integral with the rod 45 abuts the inner side of the plate 42 and abutting the other side of the plate is a clutch member 50 which may be pinned to the rod, as at 51, the flange 48 and the clutch member 50 preventing longitudinal or axial movement of the rod 45 so that rotation of the threaded rod 45 will cause the table 12 to slide on the base. The clutch member 50 cooperates or clutches with a similar clutch member 52 which is longitudinally slidable on the rod by a pivoted hand lever 53 having a yoke 54 engageable in an annular groove or recess 55 of the rod. Secured to the rod 45 is a hand crank 56 by means of which the table is moved to the left, Figs. 1 and 2 to return it to its starting position, ready to cut another gear. The slidable clutch member 52 is formed with a sprocket 57 driven by a chain 58 from a second sprocket 59 secured on a spindle 60 which is rotatable on a stub shaft 61 rigidly secured to the base 11, the spindle 60 having a gear 62 integral therewith.

Projecting forwardly of the base 11, Fig. 2 is a pair of spaced lugs or bosses 63, 64 which are integral with the base and have aligning bores in which a shaft 65 is rotatable. One end of the shaft 65 extends through the lug 64 and secured on the end of the shaft for rotation therewith is an actuator having a gear 66 meshing with a gear 62 to rotate the same. Thus, as the shaft 65 rotates, the gear 62, through the sprockets 59, chain 58, sprocket 57 and screw 46, moves the table 12 to the right, as the teeth 29 are cut in the segmental gear blank 31, the gear blank 31 also being partially rotated toward and against the milling cutter teeth 17. On the other end of the shaft 65 is secured a sprocket 67 driven by a chain 68 from a second sprocket 69 secured on the driven pulley shaft 14. Carried by the table 12 is a projection or pin 70 which when the gear cutting of a blank is completed, abuts the sprocket 57 and moves the clutch member 52 out of engagement with the clutch member 50 thus stopping movement of the table, the chain 58 being slack, as shown in Fig. 3, to prevent it from coming off of the sprockets when the sprocket 57 is shifted with the clutch member 52. The finished gear segment is then removed and the machine is stopped while the operator throws in the clutch and by means of the handle 56 returns the table to its starting position. It will now be seen that in operation, the milling cutter 16 rotates constantly and the table 12 by reason of the drive means 66 and 62 is advanced at a constant rate of speed. Rotation of the work support 27 is effected by the advance of the table 12 which causes the helical gear 25 to be rotated by the rack 26, thereby rotating the gear blank. The gear 25 which, meshing with the rack 26, rotates the blank, is a helical gear corresponding to the gears to be cut and the angle of the shaft 24 is the same as, or determines the helix angle on the finished segmented gears.

While I have shown and described my invention in detail it is to be understood that the same is to be limited only by the appended claims for many changes may be made without departing from the spirit and scope of the invention.

What I claim is:

1. A machine for cutting helical gears comprising a base, a support mounted on said base for rectilinear movement, a milling cutter arranged to rotate about a fixed axis parallel with the direction of movement of said support, a rotatable support for a gear blank and rotatable about an axis disposed at an oblique angle diagonally to the axis of rotation of the cutter equal to the helix angle of the gear to be cut, means operatively responsive to movement of said first-named support to rotate said second-named support, and drive means for moving said first-named support intermittently.

2. A machine for cutting helical gears comprising a base, a support mounted on said base for rectilinear movement, a milling cutter arranged to rotate about a fixed axis parallel with the direction of movement of said support, a rotatable support for a gear blank and rotatable about an axis disposed at an oblique angle diagonally to the axis of rotation of the cutter equal to the helix angle of the gear to be cut, means operatively responsive to movement of said first-named support to rotate said second-named support, drive means for moving said first-named support intermittently, and clutch means operatively connecting said first-named support and said drive means and operable by said first-named support.

3. A machine for cutting helical gears comprising, a base, a table slidably supported on said base for rectilinear movement, a milling cutter mounted above said base and rotatable about a fixed axis parallel with the direction of movement of said table, a rotatable support for a gear blank and carried by said table, the axis of said support being at an oblique angle diagonally to the axis of said cutter equal to the helix angle of the teeth to be provided on the blank, a screw operable to move said table, means operatively responsive to the movement of said table to rotate said support, drive means for moving said table, and clutch means operatively connecting said drive means and said screw and operable by movement of said table.

4. A machine for cutting helical gear teeth on a segmental blank comprising, a base, a table slidably mounted on said base for reciprocal movement, a rotatable shaft mounted above said table and rotatable about a fixed axis parallel to the direction of movement of said table, a milling cutter mounted on said shaft, a rotatable support for a segmental gear blank and carried by said table, the axis of rotation of said support being at a predetermined oblique angle diagonally to the axis of rotation of said cutter and equal to the helix angle of the gear teeth to be cut, mechanism including a screw for moving said table, drive means for moving said table and operatively connected to said screw, means responsive to the movement of said table for rotating said gear blank support, and means responsive to a predetermined movement of said table for stopping said table automatically.

5. A machine for cutting helical segmental gears comprising, a base, a table slidably and reciprocably mounted on said base, a milling cutter rotatably mounted above said base and having its axis of rotation parallel to the direction of movement of said table, a rotatable support for a gear blank and rotatably mounted on said table, a gear rack below said table, a helical gear on said support and cooperable with said gear rack to rotate said support, the axis of rotation of said support lying in a plane vertical to said table and at an angle thereto equal to the helix angle of said gear, a screw operable to move said table, drive means operable to rotate said screw and move said table, clutch means operatively connecting said drive means and said screw, and means carried by said table to disengage said clutch means upon predetermined movement of said table in one direction.

6. A machine for cutting helical segmental gears comprising, a base, a table slidably and reciprocably mounted on said base, a milling cutter rotatably mounted above said base and having its axis of rotation parallel to the direction of movement of said table, a rotatable support for a gear blank and rotatably mounted on said table, a gear rack below said table, a helical gear on said support and cooperable with said gear rack to rotate said support, the axis of rotation of said support lying in a plane vertical to said table and at an angle thereto equal to the helix angle of said gear, a screw operable to move said table, drive means operable to rotate said screw and move said table, clutch means operatively connecting said drive means and said screw, means carried by said table to disengage said clutch means upon predetermined movement of said table in one direction, and manually operable means for holding said clutch means disengaged during return of the table to its starting position.

7. A machine for cutting helical segmental gears comprising, a base, a table slidably and reciprocably mounted on said base, a milling cutter rotatably mounted above said base and having its axis of rotation parallel to the direction of movement of said table, a rotatable support for a gear blank and rotatably mounted on said table, releasable means for holding a gear blank tightly to said support, a gear rack below said table, a helical gear on said support and cooperable with said gear rack to rotate said support, the axis of rotation of said support lying in a plane vertical to said table and at an angle thereto equal to the helix angle of said gear, a screw operable to move said table, drive means operable to rotate said screw and move said table, clutch means operatively connecting said drive means and said screw, and means carried by said table to disengage said clutch means upon predetermined movement of said table in one direction.

JULIAN C. MEIER.